United States Patent
Wursche et al.

(10) Patent No.: US 10,570,249 B2
(45) Date of Patent: Feb. 25, 2020

(54) PROCESS FOR PREPARING POLYALKENAMERS FOR PACKAGING APPLICATIONS

(71) Applicant: Evonik Operations GmbH, Essen (DE)

(72) Inventors: Roland Wursche, Duelmen (DE); Florian Schwager, Muenster (DE); Franz Michlbauer, Kirchweidach (DE); Helmut Hausner, Trostberg (DE); Claudius Neumann, Rossdorf (DE)

(73) Assignee: Evonik Operations GmbH, Essen (DE)

( * ) Notice: Subject to any disclaimer, the term of this patent is extended or adjusted under 35 U.S.C. 154(b) by 115 days.

(21) Appl. No.: 15/751,601

(22) PCT Filed: Aug. 11, 2016

(86) PCT No.: PCT/EP2016/069127
§ 371 (c)(1),
(2) Date: Feb. 9, 2018

(87) PCT Pub. No.: WO2017/025595
PCT Pub. Date: Feb. 16, 2017

(65) Prior Publication Data
US 2018/0230263 A1 Aug. 16, 2018

(30) Foreign Application Priority Data

Aug. 12, 2015 (DE) .......................... 10 2015 215 387

(51) Int. Cl.
*C08G 61/08* (2006.01)
*C08F 6/00* (2006.01)

(52) U.S. Cl.
CPC .............. *C08G 61/08* (2013.01); *C08F 6/001* (2013.01); *C08F 6/005* (2013.01); *C08G 2261/3322* (2013.01); *C08G 2261/418* (2013.01); *C08G 2261/71* (2013.01); *Y02P 20/544* (2015.11)

(58) Field of Classification Search
CPC ....................................................... C08G 61/08
See application file for complete search history.

(56) References Cited

U.S. PATENT DOCUMENTS

| 8,461,223 B2 * | 6/2013 | Lee ......................... C08F 34/00 521/142 |
| 2009/0305957 A1 | 12/2009 | Moore et al. |
| 2010/0151098 A1 | 6/2010 | Catchpole et al. |

FOREIGN PATENT DOCUMENTS

| JP | H11-292921 | 10/1999 |
| JP | 2003-139666 | 5/2003 |
| JP | 2009-525863 | 7/2009 |
| JP | 2010-506965 | 3/2010 |
| WO | WO 01/14289 A2 | 3/2001 |
| WO | WO 01/14289 A3 | 3/2001 |
| WO | WO 2007/091901 A1 | 8/2007 |
| WO | WO 2008/010973 A1 | 1/2008 |
| WO | 2017/009411 | 1/2017 |

OTHER PUBLICATIONS

U.S. Appl. No. 15/743,205, filed Jan. 9, 2018, Roland Wursche.

* cited by examiner

*Primary Examiner* — Rip A Lee
(74) *Attorney, Agent, or Firm* — Grüneberg and Meyers PLLC (57) ABSTRACT

A process for producing cycloalkenamer-containing compositions involves converting at least one cycloalkene by ring-opening metathetic polymerization to obtain a polyalkenamer-containing product mixture. The product mixture is worked up to remove monomers and oligomers of the cycloalkenes to obtain the polyalkenamer-containing composition by extraction with $CO_2$. The extraction involves at least two stages: an extraction with liquid $CO_2$ under the supercritical conditions, and then an extraction with supercritical $CO_2$. Such cycloalkenamer-containing compositions can be used, for example, in the field of packaging materials, especially for food and drink.

18 Claims, 1 Drawing Sheet

Figure 1

Figure 2

PROCESS FOR PREPARING POLYALKENAMERS FOR PACKAGING APPLICATIONS

The present invention relates to a process for producing polyalkenamer-containing compositions. The invention further relates to the use of polyalkenamer-containing compositions in the field of packaging materials, especially for foods.

To increase the lifetime of packaged foods, it is possible to employ the principle of the active oxygen barrier. This means that, as well as the customary passive barrier layers, for example nylon-6, polyethylene terephthalate or ethylene-vinyl alcohol copolymer, additional "active" components which bind oxygen by chemical reaction (oxidation) are used in the packaging. This may firstly relate to oxygen present within a packaging (residual oxygen in modified atmosphere packaging (MAP) packaging) and secondly to oxygen which diffuses into the packaging through the passive barrier over the course of time. This "active" component may be present in different regions of the packaging; for example, it may be part of a separate layer of a multilayer packaging system or else introduced directly into the abovementioned passive barrier layer. The chemical reaction with the additional "active" component reduces any chemical reaction of the oxygen with, for example, ingredients of the packaged foods (fats, vitamins, etc.) or else aerobic bacterial and fungal growth, such that the quality of the foods is conserved for longer. This in turn give rise to advantages, since less food is spoiled prior to sale or prior to consumption and so resources are conserved in various aspects. Furthermore, a lower level of preservatives, if any, needs to be added to foods. Typically, the active component contains a readily oxidizable organic compound, and additionally further constituents such as metal salts as catalysts or else photoinitiators. Oxidizable compounds proposed for this purpose are, for example, polyoctenamers; see, for example, EP2017308A1, WO9407944A1, WO9407379A1 and WO9806779A1.

The preparation of polyoctenamer is known from the literature (see, for example, US2013/172635), and it follows the principle of what is called metathesis polymerization. It is also known that polyoctenamer, like other metathesis polymers too, starting with the monomer, contains a proportion of low molecular weight cyclic compounds (oligomers) (see A. Dräxler in Handbook of Elastomers, 2nd edition, 697-722, 2001). These molecules are relatively mobile up to a particular molecular weight, i.e. are converted to the gas phase and lead to a disadvantageous odour of packaging materials because of their odour activity. Moreover, they are fat-soluble because of their polarity, and so it is conceivable that they will pass over into the packaged material. Because of these properties, the polymers prepared by metathesis have limited possible use in packaging applications, meaning that important fields of application even remain closed, specifically for the purpose of utilization of polyoctenamers as a constituent of a packaging containing an "active oxygen barrier". Extraction of low molecular weight cyclic compounds from polyoctenamers with acetone or isopropanol has been described in the literature; see A. Dräxler in Handbook of Elastomers, 2nd edition, 697-722, 2001. EP2017308A1 also describes corresponding extractions with various solvents.

The ring-opening metathesis polymerization (ROMP) of cycloalkenes is known per se (Olefin Metathesis and Metathesis Polymerization, K. J. Irvin, J. C. Mol, Academic Press 1997; Handbook of Metathesis, Vol. 1-3, R. H. Grubbs, Wiley-VCH 2003). This reaction is catalysed by a number of transition metals or compounds thereof, often with use of a cocatalyst which, together with the transition metal or the added transition metal compound, forms the catalytically active transition metal species in a reaction. Suitable cocatalysts are particularly aluminium organyls and tin organyls.

Other catalysts are based on defined transition metal complexes. The most well-known compounds include complexes based on ruthenium (Weskamp, T. Kohl, F. J. Herrmann, W. A. J. Organomet. Chem. 1999, 582, 362-365; Weskamp, T. Kohl, F. J. Hieringer, W., Gleich, D. Hermann, W. A. Angew. Chem. Int. Ed. 1999, 38, 2416-2419; Nguyen, S. T., Johnson, L. W., Grubbs, R. H., Ziller, J. W., J. Am. Chem. Soc. 1992, 114, 3974-3975; Bielawski, C. W., Grubbs, R. H., Angew. Chem. Int. Ed. 2000, 39, 2903-2906). However, a disadvantage here is their high cost, and particularly the difficulty of separation thereof from the reaction product. Residues of ruthenium lead to an often unacceptable colour of the product. In these cases, the polymer has to be purified by complex methods, for example reprecipitation, which is a barrier to economic preparation.

The properties of the resulting polymer can be adjusted via parameters such as temperature, concentration of monomer, catalyst concentration and reaction time. The molecular weight can be controlled via the addition of chain transfer agents, the task of which is to terminate the growing chain. Since the process is a statistical process, the molecular weight, in a first approximation, is in a reciprocal relationship to the concentration of chain transfer agent. Broadening of the molecular weight distribution as a consequence of secondary metathesis (chain transfer or "back-biting") is not being considered here. Thus, it is possible through addition of chain transfer agents to affect the molecular weight, but not the breadth of the molecular weight distribution. Later on in the reaction, there is secondary metathesis, in which what adds onto the active end of a growing chain is not a further monomer molecule but an existing polymer chain. The result is chain transfer, which results in an increase in the polydispersity (expressed as $(M_w/M_n)-1$ or $M_w/M_n$). A further observation with advancing reaction is the shift in the cis/trans ratio in favour of the trans configuration. This is an effect which can likewise be attributed to the secondary metathesis. In order to establish particular properties in the polymer, what is thus required is exact control of a wide variety of different process parameters.

The polymerization of cycloalkenes by ROMP constitutes an important process for preparing polyalkenamers. One example of this is the polymerization of cyclooctene to give polyoctenamer (for example VESTENAMER® from Evonik Industries, DE). In general, the polyalkenamer is used in solid form; for some applications, however, it is necessary for the polymer to be in a liquid state at room temperature. An important application for polyalkenamers is use in packaging, for example in packaging films, in order to improve the barrier properties of the film, especially with respect to oxygen, but also other substances, for example $CO_2$ or water. More particularly, the barrier properties are improved by the chemical binding of oxygen by the polyalkenamers (active barrier effect). In this case, generally a transition metal compound which accelerates the reaction of the polyalkenamer with oxygen is added to the polyalkenamer (EP2017308A1).

The polymerization of the cycloalkenes leaves monomers and oligomers of the monomer in the product mixture obtained. Studies have shown that these compounds in particular have elevated odour activity. Several authors report that the odour activity is correlated to the molar mass among other properties. Odorous substances of this kind (odour-active organic compounds, OVOCs), according to the source, have molar masses of not more than 350 g/mol or less than 300 g/mol, in order to be sufficiently volatile and perceptible as an odour (M. Schlegelmilch, Geruchsmanagement: Methoden zur Bewertung and Verminderung von Geruchsemissionen [Odour Management: Methods of Assessing and Reducing Odour Emissions], Hamburger Berichte 32 from the Hamburg-Harburg University of Technology, Abfall aktuell Publishers 2009, ISBN 978-3-9810064-9-0; M. Schön, R. Hübner, Geruch—Messung and Beseitigung [Odour—Measurement and Elimination], Vogel Publishers Würzburg, 1st edition 1996, ISBN 3-8023-1561-8; Umweltbundesamt, Innenraumlufthygiene-Kommission des Umweltbundesamtes, Leitfaden für die Innenraumhygiene in Schulgebäuden [German Environment Agency, Indoor Air Hygiene Commission of the German Environment Agency, Guidelines for Indoor Air Hygiene in School Buildings], page 47, 2008; G. Scharfenberger, Papier+ Kunststoff-Verarbeiter 10, 1990).

The use of supercritical gases for extraction of solids has long been known (Munshi et al. in Current Science 97(1), 2009, 63-72; The Pharma Innovation Journal 2014, 3(5) 19-24). The extraction of low molecular weight constituents from polymers has also been described (U.S. Pat. No. 4,306,058; Journal of Chromatography A, 855 (1999) 715-721; Journal of Applied Polymer Science, Vol. 101, 4487-4492 (2006); Bartle et al. in Anal. Chem. 1991, 63, 2371-2377). It is also possible here to use cosolvents. Because of the known disadvantages associated with the use of organic solvents and the fact that the gases are combustible or can be separated again from the end product only with considerable difficulty, carbon dioxide is a preferred extractant in the prior art.

However, it has been found that the customary extraction with supercritical carbon dioxide has an adverse effect on the material consistency of the extracted product, since it partially sinters or is at least partially compressed in the course of extraction with standard process parameters. This has the effect of reduced permeability, which can lead to edge flows and channel formation. This results in reduced extraction performance. In addition, the extraction material, after extraction, may no longer be in the original powder or granule form.

The problem addressed was thus that of providing a process for producing polyalkenamer-containing compositions which results in products having reduced odour activity. Compared to the methods of the prior art, polymers having a suitable reduced monomer and oligomer content were to be obtained. The monomers and oligomers were to be removed by the gentle $CO_2$ extraction, but without causing sintering or compression of the polyalkenamers. The polyalkenamer compounds were to have at least an equal active barrier effect (for example equal effect in the chemical binding of oxygen). This was to assure use in the food sector.

The object was achieved by conducting the $CO_2$ extraction in two stages.

The object was accordingly achieved by a process for producing a polyalkenamer-containing composition, comprising the steps of:
  a) converting at least one cycloalkene by ring-opening metathetic polymerization to obtain a polyalkenamer-containing product mixture, and
  b) working up the product mixture to remove monomers and oligomers of the cycloalkenes to obtain the polyalkenamer-containing composition by extraction with $CO_2$ ($CO_2$ extraction), wherein the extraction comprises at least two stages:
  b1) an extraction with liquid $CO_2$ and then
  b2) an extraction with supercritical $CO_2$.

In this way, monomers and oligomers are extracted from the product mixture by means of $CO_2$ as extractant. The two-stage process according to the invention prevents sintering or compression of the extraction material.

The conditions of the extraction are adjusted such that no supercritical $CO_2$ is present in stage b1. Thus, sintering and compression can be avoided. The extraction is consequently commenced with liquid carbon dioxide. For this purpose, liquid carbon dioxide first has to be passed at least once through the extraction apparatus before it is possible to work under supercritical conditions. Thereafter, the conditions are adjusted such that supercritical $CO_2$ is present.

The optimal temperature and pressure conditions in stage b2 for removal of monomers and oligomers are determined by the person skilled in the art in accordance with the oligomer distribution by means of simple preliminary experiments.

Preferably, the $CO_2$ is first brought, converted under subcritical conditions (pressure below 73.8 bar or temperature below 31° C.) to the liquid state of matter (stage b1), for example by means of a heat exchanger, a pump or a compressor. The liquid $CO_2$ preferably has a temperature in the range from more than 0° C. to 99° C. and a pressure in the range from 10 bar to 1000 bar (pressure and temperature are matched to one another here such that the $CO_2$ is in liquid form). Accordingly, the conditions of stage b1 can be adjusted such that either the temperature or the pressure is already above the critical point. However, it is preferable that at least the temperature is kept below the critical temperature of 31° C.

In this respect, the pressure or temperature in stage b1 is set as follows:
i) pressure and temperature are below the critical value for $CO_2$ or
ii) the pressure is above and the temperature is below the critical value for $CO_2$ or
iii) the pressure is below and the temperature is above the critical value for $CO_2$.

It is preferable here to choose variant ii or iii, since one parameter (pressure or temperature) has already been established for the extraction in step b2 and there is no need for readjustment. Variant ii is particularly preferred, since it is less complex in apparatus terms and less time-consuming to raise the temperature and not the pressure to establish the critical conditions. In the event of a pressure increase, heat of compression additionally arises; this heat additionally has to be removed.

The supercritical gas is subsequently brought under the supercritical conditions, for example, by means of a heat exchanger, a pump or a compressor (stage b2). For this purpose, the $CO_2$ preferably has a temperature in the range from 31° C. to 99° C. and a pressure in the range from 74 bar to 1000 bar. Preference is given to a temperature in the range of 40° C. to 90° C. and a pressure in the range from 100 bar to 500 bar. Particular preference is given to a temperature in the range of 40° C. to 70° C. and a pressure in the range from 200 bar to 500 bar; even more preferred are temperatures in the range of 40° C. to 50° C. and pressures in the range from 250 bar to 500 bar. The higher the pressure, the better the extraction outcome should generally be. The pressure can be limited by the extraction apparatus used.

The supercritical carbon dioxide is passed into an extraction vessel in which the polyalkenamer-containing product mixture is present. Preferably, the supercritical carbon dioxide is passed continuously through the extraction material.

In the process according to the invention, the relative mass throughput (called S/F=solvent/feed ratio hereinafter) may be between 10 kg up to 500 kg of $CO_2$ per kg of polyalkenamer-containing product mixture. Ideally, the S/F values are between 25 kg and 250 kg of $CO_2$ per kg of polyalkenamer-containing product mixture. At an S/F value of below 10 kg per kg of polyalkenamer-containing product mixture, no significant depletion of the monomers and oligomers is observed.

The extraction according to step b2) is appropriately followed by a separation of the $CO_2$ extractant from the extracted material (monomers and oligomers). This can be accomplished by a process familiar to the person skilled in the art (process I; cf., for example, EP0154258 A2). For example, this can be effected by means of a separator, in such a way that the $CO_2$ extract is subjected to temperature-pressure conditions under which the $CO_2$ encompassed by the extract is converted to the gaseous state and the phase comprising extracted monomers and oligomers is present in the liquid state. Variation of the pressure and/or temperature conditions then also results in variation of the solution properties of the gas, and the previously dissolved substances are then, for example, separated out from the gas in a separation vessel. The gaseous $CO_2$ can then be converted back to the liquid state, transferred into a reservoir vessel and then recycled into the extraction circuit in the supercritical state (for example by means of a pump). The $CO_2$ can be purified by means of adsorbents which may be in gaseous, liquid or supercritical form. Suitable adsorbents are, for example, selected from activated carbon, aluminium oxide, silicon oxide or mixtures, the mixtures including, for example, aluminosilicates such as zeolites.

Preferably, the extract-laden $CO_2$ is decompressed to a pressure below the critical pressure (73.8 bar). This cools the gas down and it is then in the form of a wet vapour. An extract-rich liquefied gas phase and a virtually extract-free gas phase are formed, the ratio being dependent on the starting pressure or temperature. For separation, the liquid carbon dioxide is evaporated, preferably continuously, and then brought to the separation temperature in an isobaric manner. For this purpose, preferred temperatures are at least 1 K-50 K above the boiling point at the respective prevailing separation pressure. Particular preference is given to temperatures of 5 K-40 K and very particular preference to temperatures of 10-20 K above the boiling point.

After the separation, regenerated gas can be liquefied at the pressure-dependent concentration temperature and fed back to the process.

Alternatively, the process according to the invention and hence also the separation can be conducted under critical $CO_2$ conditions, where an adsorbent takes up or binds the extracted material (monomers and oligomers) (process II). It is preferable here to maintain the pressure with respect to step b2 and to reduce (still critical temperature) or maintain the temperature (isobaric conditions), whereby maintaining the temperature is preferred. Suitable adsorbents are, for example, selected from activated carbon, aluminium oxide, silicon oxide or mixtures, the mixtures including, for example, aluminosilicates such as zeolites. Activated carbon is a preferred adsorbent. It is possible here to effect the polyalkenamer-containing product mixture with the adsorption material chosen in each case, for example, by homogeneous or heterogeneous mixing, by layered introduction of the adsorption material into the polyalkenamer-containing product mixture, or by downstream connection of the adsorption material. It is preferable when the adsorbent is introduced into the bed in layers, or else when it is connected downstream of the bed to be extracted.

It has been found to be particularly advantageous when the separation is conducted by process II, especially under isobaric conditions. Particularly at relatively high S/F values (>50), process II is distinctly superior to process I (extraction by means of a separator). The advantages resulting from significantly lower energy consumption and lower capital costs clearly outweigh the additional costs for the adsorption material. The S/F value for process II is preferably set to 50-400 kg of $CO_2$ per kg of polyalkenamer-containing product mixture. More preferably to 50-200 kg of $CO_2$ per kg of polyalkenamer-containing product mixture.

Figure 1:
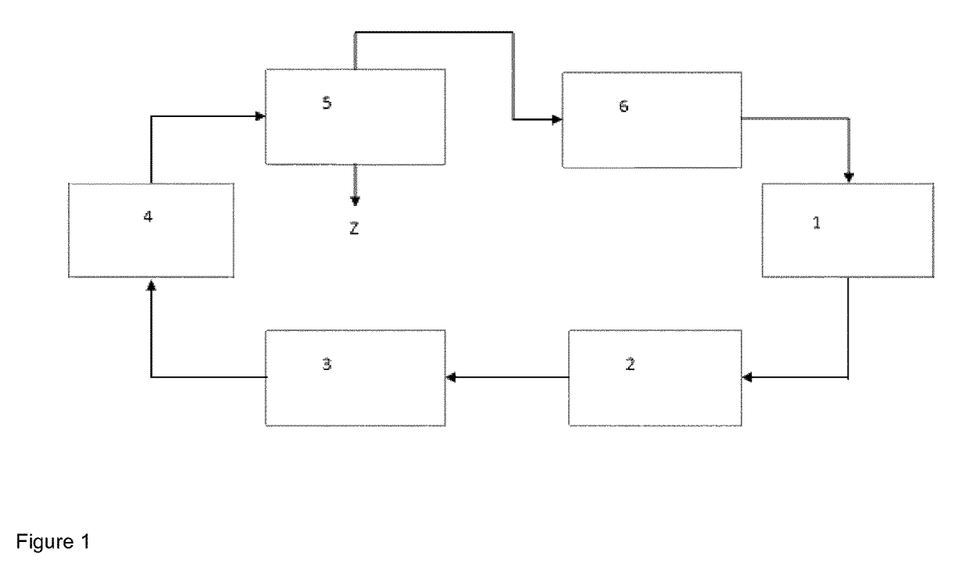

FIG. 1 shows a schematic construction of a plant in which the process I is conducted. The $CO_2$ is retained in a reservoir vessel (1). Arranged downstream is a high-pressure pump or a compressor (2). Upstream of the autoclave (extraction vessel) (4) is a heat exchanger (3). Downstream of the autoclave, the $CO_2$ is guided into a separation vessel (5) where the mono- and oligomers Z are collected. The gas removed from the separation vessel (5) is liquefied in a condenser (6) and fed back to the reservoir vessel (1).

Figure 2:
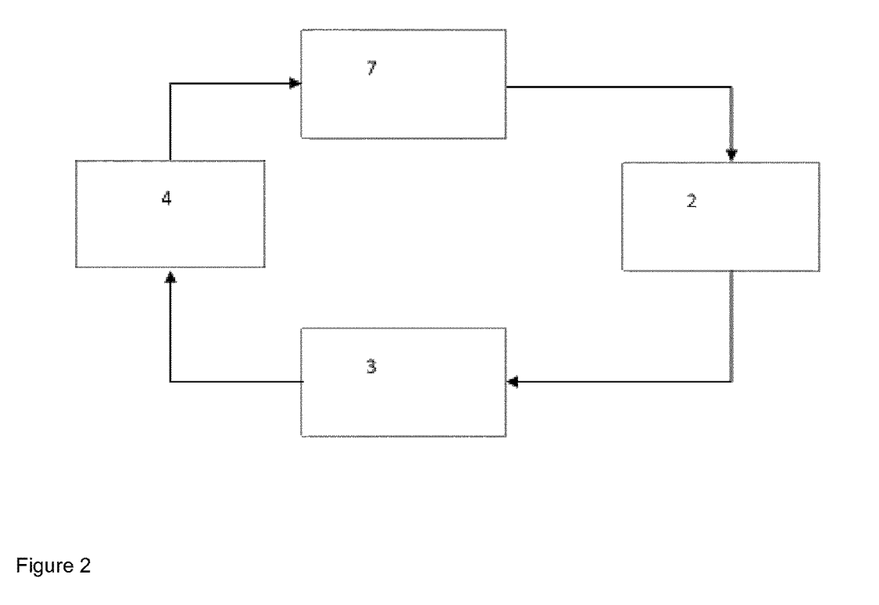

FIG. 2 demonstrates a plant construction for a process II. In a departure from the apparatus of process I, the separation vessel is replaced by a pressure vessel (7) into which the $CO_2$ is guided; this apparatus contains the adsorbent. The gas is subsequently conducted to the autoclave (4) via pump (2) and heat exchanger (3). The reservoir vessel (1) is not shown in FIG. 2; it is outside the circuit in order to assure an isobaric mode of operation.

The processes can be performed continuously. While the polyalkenamer-containing product mixture has been extracted in a first autoclave, a second autoclave may be equipped with further product mixture. After processing the first autoclave, supercritical $CO_2$ is directed to the second autoclave. The pressure in the first autoclave is relieved. This process has the advantage to use supercritical or compressed $CO_2$ without any additional energy input.

The $CO_2$ flows through the polyalkenamer-containing product mixture, for example, in a radial or axial manner. In the case of radial inflow, it has been found to be favourable when the flow direction leads from the outside inward. This gives rise to a backup, with the consequence that the $CO_2$ is more homogeneously distributed in the bed.

The amount of supercritical $CO_2$ is unrestricted. The ratio of the total weight of supercritical $CO_2$ based on the total weight of the polyalkenamer-containing product mixture is preferably in the range of 1:1 to 500:1, preferably in the range of 10:1 to 200:1 and more preferably in the range of 20:1 to 50:1.

The $CO_2$ may contain a cosolvent. Suitable cosolvents are selected from the group of the aromatic hydrocarbons such as toluene, alkanes, chlorinated alkanes, alcohols, alkanecarboxylic esters, aliphatic ketones, aliphatic ethers, water and mixtures thereof. A preferred cosolvent is hexane. It is preferred that the $CO_2$ contains less than 10 wt.-% cosolvent, based on the mass of $CO_2$ and cosolvent, more preferably 0.5-7.5 wt.-%, most preferably 1-6 wt.-%.

Oligomers in the context of this invention especially include the dimer, trimer and tetramer of the cycloalkene used. Polyalkenamers in the context of this invention are polymers of cycloalkenes comprising at least five cycloalkene monomer units.

It is preferable that the sum total of monomer, dimer, trimer and tetramer (impurities) in the polyalkenamer-containing composition is less than 20 000 ppm, based on the total weight of the composition. More preferably less than 10 000 ppm, even more preferably less than 3500 ppm and especially less than 1000 ppm of impurities are present.

The di-, tri- and tetramers are determined quantitatively as follows:

Sample preparation: 400 mg of sample in each case are weighed accurately into a 10 ml standard flask and about 8 ml of dichloromethane are added. With the aid of an agitator, the sample is dissolved (ideally overnight); subsequently, the standard flask is made up to the mark with dichloromethane and mixed again. 50 µl of the sample solution thus obtained are injected with a microlitre syringe into a pad of silanized glass wool within a TDS tube. The tube is left to stand in a fume hood for about 30 minutes, so that the solvent can evaporate.

External standard solution: 50 mg of hexadecane are weighed accurately into a 100 ml standard flask, made up to the mark with methanol and homogenized by shaking. 5 µl of this solution (corresponding to about 2.5 µg) are applied to a Tenax tube. This external standard is analysed once at the start and once at the end of the sequence.

The determination was effected by means of an Agilent 6890 gas chromatograph with ChemStation software; parameters: Rtx-5 separation column; length: 60 m; internal diameter: 250 µm; film thickness: 0.25 µm; carrier gas: helium; column supply pressure: 203.1 kPa; oven temperature: 50° C.-10° C./min-320° C. (33 min); split: 50:1; detector temperature: 280° C. (Thermal Aux)). The thermal desorption unit has been set up as follows: Gerstel TDSA; TDS oven (initial temperature: 20° C.; equilibration time: 1 min; initial time: 0.5 min; heating rate: 60° C./min; end temperature: 280° C.; hold time: 10 min); cold application system (initial temperature: −150° C. (with liquid $N_2$ cooling); equilibration time: 1 min; initial time: 0.5 min; heating rate: 10° C./s; end temperature: 300° C.; hold time: 5 min). In addition, the following settings were used: transfer temperature: 300° C.; desorption mode: Solvent Venting—Dry Purge; venting time: 0.5 min; sample mode: Remove Tube.

The semiquantitative evaluation was effected against the external standard hexadecane. The response factor is assumed to be 1. Only the peak groups corresponding to the oligomers are integrated. The dimers elute around 20 min, the trimers at about 28 min and the tetramers around 37 min. Whether the peaks belong to the integrated region is determined using the mass spectra, the oligomers being easily characterizable by the ion masses (e.g. m/z=220, m/z=330 and m/z=440: di-, tri- and tetramer of polyoctenamer, respectively).

The monomer was determined as follows:

Sample preparation: 300 mg of sample are weighed accurately into each of 6 headspace vials, 5 ml of dodecane are added and the mixture is homogenized by agitation. Two mixtures are analysed as samples. To each of two further mixtures are added 5 µl of the spiking solution. To each of the two other mixtures are added 10 µl of the spiking solution. Spiking solution: 300 mg of cyclooctane and 40 mg of cyclooctene are weighed accurately into a 25 ml standard flask and made up to the mark with dodecane and homogenized by shaking. 5 ml of this solution are pipetted into a 25 ml standard flask and made up to the mark with dodecane and homogenized by shaking.

The determination was effected by means of an Agilent 7890 gas chromatograph with ChemStation software; parameters: separation column 1: fused silica CP-SIL 8CB; length: 50 m; internal diameter: 530 µm; film thickness: 1 µm; separation column 2: fused silica DB-WAX; length: 60 m; internal diameter: 530 µm; film thickness: 1 µm; carrier gas: nitrogen; column supply pressure: 10.15 psi; oven temperature: 50° C. (4 min)-5° C./min-130° C.-30° C./min-180° C. (10 min); injector temperature: 160° C.; detector temperature: 230° C.; detector $H_2$ flow: 40 ml/min; detector air flow: 400 ml/min; make-up flow ($N_2$): 25 ml/min.; headspace sampler: TurboMatrix 40 Perkin Elmer: oven temperature: 100° C.; needle temperature: 120° C.; transfer temperature: 150° C.; headspace pressure: 130 kPa; thermostating time: 60 min; pressure buildup time: 0.5 min; injection time: 0.16 min: needle residence time: 0.2 min; vial vent: yes. The quantitative evaluation was effected by the standard addition method on the two separation columns and over both spiking operations with a validated Excel sheet.

The conversion of the cycloalkene(s) can be conducted without solvent. Alternatively, the reaction can be conducted in at least one solvent. Suitable solvents are, for example, saturated aliphatic hydrocarbons such as hexane, heptane, octane, nonane, decane, dodecane, cyclohexane, cycloheptane or cyclooctane; aromatic hydrocarbons such as benzene, toluene, xylene or mesitylene; halogenated hydrocarbons such as chloromethane, dichloromethane, chloroform or carbon tetrachloride; ethers such as diethyl ether, tetrahydrofuran or 1,4-dioxane; ketones such as acetone or methyl ethyl ketone; esters such as ethyl acetate; and mixtures of the aforementioned solvents. More preferably, the solvent for the reaction is selected from the group consisting of aliphatic and aromatic hydrocarbons, here especially preferably hexane and toluene and especially hexane. Additionally selected with preference are tetrahydrofuran, methyl ethyl ketone, chloromethane, dichloromethane, chloroform or mixtures thereof, very particular preference being given to hexane or toluene. The content of solvents may be set, for example, to a value of 20% to 60% by weight, preferably of 40% to 60% by weight, based on the total weight of cycloalkene and solvent.

In the choice of solvents for the ring-opening metathesis reaction, it should be noted that the solvent should not deactivate the catalyst or the catalytically active species. This can be recognized by the person skilled in the art by simple experiments or by studying the literature. In the case of catalyst systems containing aluminium organyls, aromatic or aliphatic hydrocarbons bearing no heteroatoms are especially suitable.

In a further embodiment of the invention, the solvent mixture may contain a stabilizer. This can diffuse into the polyalkenamer and increase its storage stability and/or processing stability. Suitable stabilizers may be selected from the group of the sterically hindered phenols, for example 2,5-di-tert-butylhydroquinone, 2,6-di-tert-butyl-p-cresol, 4,4'-thiobis(6-tert-butylphenol), 2,2'-methylenebis(4-methyl-6-tertbutylphenol), octadecyl 3-(3',5'-di-tert-butyl-4'-hydroxyphenyl)propionate, 4,4'-thiobis-(6-tert-butylphenol), 2-tert-butyl-6-(3-tert-butyl-2-hydroxy-5-methylbenzyl)-4-methylphenyl acrylate, 2,6-di(tert-butyl)-4-methylphenol (BHT), 2,2-methylenebis(6-tert-butyl-p-cresol), from the group of the organic phosphites, for example triphenyl phosphite, tris(nonylphenyl) phosphite, the group of the organic thio compounds, for example dilauryl thiodipropionate, pentaerythritol tetrakis(3-lauryl-thiopropionate) and ascorbic acid and mixtures thereof.

The stabilizer may be present within a range from 5 to 7500 ppm, preferably 25 to 750 ppm, based in each case on the weight-average molecular weight of the polyalkenamer, preferably polyoctenamer. It is possible to add the stabilizer according to one of the following steps:

The stabilizer can be incorporated into the melt of the polymer, for example via compounding in an extruder. The stabilizer can either be metered in directly or added via a masterbatch. This can also occur only in the course of further processing to give a blend with a polymer and/or the production of shaped bodies, for example films. Another option is to dissolve the stabilizer in a suitable solvent and to apply it to the particles of the polyalkenamer. Subsequently, the solvent is removed, for example by a drying step, in which elevated temperature and/or reduced pressure are used. The stabilizer then remains on the surface of the particles and/or is absorbed into the particles during the drying. Another option is to apply the stabilizer to the particles as a powder coating.

It is also possible to produce a mixture in which polyalkenamer particles including a stabilizer in a relatively high concentration are present alongside polyalkenamer particles containing no stabilizer or a lower concentration of stabilizer.

In addition, the polyalkenamer composition, preferably polyoctenamer composition, may contain dyes (soluble colourants).

In a preferred embodiment of the process according to the invention, the cycloalkene is selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene and mixtures thereof. Particular preference is given to cyclopentene, cycloheptene, cyclooctene and cyclododecene. Cyclooctene is a very particularly preferred cycloalkene because of its availability and ease of handling. It is possible to use two or more cycloalkenes, so as to form copolymers of the polyalkenamer. The cycloalkenes may be substituted by alkyl groups, aryl groups, alkoxy groups, carbonyl groups, alkoxycarbonyl groups and/or halogen atoms.

In one embodiment of the process according to the invention, a standard solvent extraction can be conducted prior to the $CO_2$ extraction or after the $CO_2$ extraction. This can further reduce the proportion of monomers and oligomers. The solvent extraction can be undertaken within a temperature range from 20° C. up to the boiling range of the solvent mixture (reflux), preferably to 60° C., more preferably in the range from 30° C. to 50° C. and even more preferably in the range from 35° C. to 45° C. However, the temperature within the ranges of values mentioned is limited by the boiling point of the solvent and the properties of the polyalkenamers. For example, the temperature should not be above the melting point of a semicrystalline polymer or the glass transition temperature of an amorphous polymer, preferably at least 5° C. below the boiling range. It is possible in principle to extract the polyalkenamer in the molten state. However, this is less preferred since the discrete particles originally present can form lumps or coalesce. This reduces the surface area of the extraction material, and the extraction rate falls. As a result, the product obtained has to be converted back to a homogeneous particulate form after the extraction, for example by granulation or grinding.

Illustrative solvents for the solvent extraction may be selected from hexane, heptane, diamyl ether, diethyl ether, butyl butyrate, ethyl amyl ketone, butyl acetate, methyl isobutyl ketone, methyl amyl ketone, amyl acetate, ethyl n-butyrate, carbon tetrachloride, diethyl carbonate, propyl acetate, diethyl ketone, dimethyl ether, toluene, ethyl acetate, tetrahydrofuran, benzene, tetrachloroethylene, chloroform, methyl ethyl ketone, chlorobenzene, dichloromethane, chloromethane, 1,1,2,2-tetrachloroethane, ethylene dichloride, acetone, 1,2-dichlorobenzene, carbon disulphide, 1,4-dioxane, cresol, aniline, pyridine, N,N-dimethylacetamide, cyclohexanol, cyclohexanone, butyl alcohol, 2-butyl alcohol, acetonitrile, dimethyl sulphoxide, N,N-dimethylformamide, furfuryl alcohol, propylene glycol, 1,2-propylene carbonate, ethanol, methanol, propanol, isopropanol, butanols, ethylene glycol, ethylene carbonate, glycerol, water or mixtures thereof. The person skilled in the art will be able to find suitable solvents or mixtures by simple preliminary experiments.

The solvent extraction can be conducted in various forms; for example, it is possible to employ the principle of Soxhlet extraction, such that the material to be extracted is contacted semi-continuously with fresh solvent. The solvent extraction can also be conducted in such a way that, for example, in a stirred tank, the volume of solvent at a particular time is exchanged completely or partially for a new volume of solvent, in which case this can be repeated several times. In addition, it is possible to conduct the solvent extraction in such a way that a solvent recycling operation is integrated, in which case the recycling may relate to one or more components of the mixture. As the case may be, it may then be necessary to meter more of one or more of the components into the recyclate in order to re-establish the original mixing ratio. In addition, the solvent extraction can also be conducted in such a way that the ratio of the components changes in the course of the solvent extraction, in which case the change may be constant or occur in jumps.

The solvent extraction is preferably conducted under inert gas.

The temperature and/or the pressure can be kept constant during the solvent extraction. It is also conceivable that temperature or pressure are varied in the course of the extraction operation.

After the solvent extraction, the polyalkenamer-containing composition can be separated from the remaining solvent, for example, by decanting it off or filtering. Alternatively or additionally, a drying operation can be conducted, for example under reduced pressure and/or at elevated temperature, in order to remove the solvent.

The polyalkenamer-containing product mixture obtained in a) may be in solid form or dissolved in solvent. Preferably, the solvent is removed. This can be undertaken by heating or reducing the pressure, for example by means of vacuum degassing. Prior to the performance of step b) ($CO_2$ extraction) or prior to the performance of an optional solvent extraction, the product mixture is preferably pelletized to particles, for example by strand pelletization or underwater pelletization, or pulverized, for example by spray-drying or grinding. In a preferred embodiment, the polyalkenamer-containing product mixture obtained in a) is in solid form and is pelletized or pulverized to particles prior to step b). Preferably, the mean mass of the particles is less than 100 g/1000, more preferably less than 10 g/1000 and especially preferably less than 1 g/1000. This includes mean masses up to a maximum size of 1000 g/1000. The particles preferably have a diameter of at least 0.3 mm, more preferably of at least 0.5 mm and most preferably of at least 0.8 mm.

To determine the mean mass, about 2-3 g of the particles are applied to a clean underlayer, for example a sheet of paper. Subsequently, all grains in this sample are counted and transferred to a petri dish; spikes of length>1.0 cm or chains of pellets>1.0 cm are excluded (discarded) and are not assessed here. The number of pellet grains is noted; it has to be min. 150. Subsequently, the pellet grains are weighed accurately to 0.1 g and expressed on the basis of 1000 pellets. If there are less than 150 pellet grains, a new, correspondingly larger particle volume has to be taken as sample.

The process according to the invention can be conducted continuously or batchwise.

The polyalkenamer, preferably polyoctenamer, preferably has a weight-average molecular weight ($M_w$) of 5000 g/mol to 500 000 g/mol, preferably of 10 000 g/mol to 250 000 g/mol and more preferably of 20 000 to 200 000 g/mol. The molecular weight is determined by means of Gel Permeation Chromatography (GPC) against a styrene standard. The measurement is based on DIN 55672-1.

Sample preparation: The samples are dissolved with a content of 5 g/l in tetrahydrofuran at room temperature. They are filtered prior to injection into the GPC system (0.45 μm syringe filter). The measurement is effected at room temperature.

Column Combination
1×5 cm, 5 μm, 100 Å, (styrene-divinylbenzene copolymer)
1×30 cm, 5 μm, 50 Å, (styrene-divinylbenzene copolymer)
1×30 cm, 5 μm, 1000 Å, (styrene-divinylbenzene copolymer)
1×30 cm, 5 μm, 100 000 Å, (styrene-divinylbenzene copolymer)
Mobile phase: ultrapure tetrahydrofuran, stabilized
Flow rate: 1 ml/min
Detection: refractive index detector
Calibration: polystyrene The desired molar mass can be established, for example, in the presence of at least one chain transfer agent, which allows the chain buildup to be stopped. Suitable chain transfer agents are, for example, acyclic alkenes having one or more non-conjugated double bonds which may be in terminal or internal positions and which preferably do not bear any substituents. Such compounds are, for example, pent-1-ene, hex-1-ene, hept-1-ene, oct-1-ene or pent-2-ene. In addition, it is possible to use cyclic compounds having a double bond in the side chain thereof, for example vinylcyclohexene.

The cis/trans ratio of the cycloalkenamers can be adjusted by methods familiar to the person skilled in the art. For example, the ratio is dependent on catalysts, solvents, stirring intensity or temperature or reaction time. Preferably, the trans content is at least 55%. The cis/trans ratio is determined by means of $^1$H NMR in deuterochloroform.

The conversion of the cycloalkene can be effected in the presence of at least one catalyst. Suitable catalysts are, for example, transition metal halides which, together with an organometallic compound as cocatalyst, form the species which is catalytically active for the polymerization. The metal in the organometallic compound differs here from the transition metal in the halide. Alternatively, it is possible to use transition metal-carbene complexes. Useful transition metals include metals of groups 4 to 8, for example molybdenum, tungsten, vanadium, titanium or ruthenium. Metals in the organometallic compound are, for example, aluminium, lithium, tin, sodium, magnesium or zinc. Suitable catalysts and the amounts thereof to be used are detailed, for example, in EP-A-2017308.

Preference is given to using a catalyst system containing at least one alkylaluminium chloride, tungsten hexachloride or mixtures. Suitable alkylaluminium chlorides are ethylaluminium dichloride ($EtAlCl_2$) and ethylaluminium sesquichloride, which may also be used in mixtures. A preferred catalyst system contains tungsten hexachloride and ethylaluminium dichloride or, in a particularly preferred embodiment, consists of these two compounds. The mass ratio of the aluminium chlorides to tungsten hexachloride is preferably one to six. Particular preference is given to a ratio of two to five. To activate the catalyst, acidic compounds such as alcohols can be used.

The tungsten hexachloride can be used within a range from 0.1 to 0.04 mol %, more preferably from 0.1 to 0.01 mol %, based on the cycloalkene used. The alkylaluminium chlorides are preferably within a range from 0.2 to 0.08 mol %, more preferably 0.2 to 0.02 mol %, based on cycloalkene.

The conversion of the cycloalkenes can be conducted either isothermally or adiabatically. The temperature is preferably within a range between −20 and 120° C. This is dependent particularly on the monomers used and any solvent present. A particularly preferred temperature is in the range from 10 to 60° C. The reaction preferably takes place in a protective gas atmosphere. In the case of an adiabatic process regime, the temperature can be determined via parameters such as amount of catalyst, rate of catalyst addition, time of termination of the reaction, etc. The preferred temperature range here is 20 to 50° C.

On attainment of the desired reaction time, the polymerization can be ended by inactivation of the catalyst system. For this purpose, for example, it is possible to add a suitable amount of CH-acidic compound. Suitable examples for this purpose are alcohols such as methanol, ethanol, propanol, etc., or else carboxylic acids such as acetic acid.

The invention likewise provides for the use of at least one polyalkenamer-containing composition according to the invention or of at least one composition obtained by the process according to the invention in packaging materials, wherein the packaging materials are preferably used for food and drink.

EXAMPLES

A. Polymer

Polymer 1: Vestenamer® 8020 (Polyoctenamer) of Evonik, Germany was used as the polyalkenamer-containing product mixture (average dimension of the granules is about 3 mm×3 mm×4 mm).

Polymer 2: Polymer 2 was produced from polymer 1 by a re-granulation process. Polymer 1 was fed into a twin screw extruder Werner&Pfleiderer ZSK30 via the main hopper. The barrel temperature was 125° C. A screw speed of 250 rpm was applied and the throughput of the polymer was chosen to be 6 kg/h. The effective melt temperature at the die was measured with a thermometer to be 186° C. After leaving the front plate of the extruder at the die the melt strand was cooled in a water bath and after that in air. Then the polymer strand was pelletized with a pelletizer (cutter). The cutter was operated at a strand speed of 57 m/min. The re-granulation process was conducted until an amount of 100 kg of polymer 2 (average dimension of the granules is about 1 mm×1 mm×1 mm) was obtained.

Determination of Molecular Weight

The molecular weights of the polymers were determined by gel permeation chromatography (method: cf. description).

|  | Mn in g/mol | Mw in g/mol | Mp in g/mol | Polydispersity |
|---|---|---|---|---|
| Polymer 1 | 8700 | 156100 | 114000 | 18.0 |
| Polymer 2 | 9100 | 164300 | 116900 | 18.1 |

Mn = number average molecular weight
Mw = weight average molecular weight
Mp = peak molecular weight Trans Content of Double Bonds The trans-content of double bonds of both polymers was determined by $^1$H NMR in deuterochloroform ($CDCl_3$). The trans-content was 80% for polymer 1 and polymer 2.

Average Particle Weight

Polymer 1: The average weight of the particles is 54.0 g/1000.

Polymer 2: The average weight of the particles is 2.1 g/1000.

(method: cf. description)

Oligomers Before Extraction

|  | Monomer/mg/kg | Dimer/mg/kg | Trimer/mg/kg | Tetramer/mg/kg |
|---|---|---|---|---|
| Polymer 1 | 42 | 3520 | 9576 | 6487 |
| Polymer 2 | 18 | 1629 | 9969 | 6604 |

B. Extraction

The autoclave of an extraction system according to FIG. 1 (process I) or FIG. 2 (process II) is charged with the polyoctenamer-containing composition to be worked up (extraction material; polymer 1 or polymer 2). Stages b1 and b2 are conducted in the same plant.

Stage b1

Carbon dioxide is set above the critical pressure by means of a high-pressure pump. The heat exchanger is closed manually. The temperature is 20° C. (below the critical conditions). The carbon dioxide is in the liquid state of matter and flows through the composition in the autoclave. 20 kg of $CO_2$ were used in each case.

Stage b2—Process I

The process is conducted with a separator (process I). The autoclave is charged with the polyoctenamer. The CO2 is withdrawn from a reservoir vessel and brought to the supercritical extraction pressure with a high-pressure pump. The temperature (increased by the heat exchanger) is above the critical temperature of CO2. Subsequently, the supercritical CO2 flows continuously through the autoclave with the extraction material in an axial manner by means of the same high-pressure pump, and in so doing dissolves the $CO_2$-soluble mono- or oligomers. The supercritical carbon dioxide is guided continuously through the extraction material.

The laden CO2 is then expanded into a separator under non-supercritical conditions (pressure<73.8 bar, temperature<31° C.). This cools the gas down to give a wet vapour. An extract-rich liquid gas phase and a virtually extract-free gas phase are formed. For the separation, the liquid carbon dioxide is evaporated continuously at 45 bar and then brought to the separation temperature of 27° C. in an isobaric manner. The substances dissolved in the liquid CO2 separate out continuously in the vessel bottoms.

The gaseous CO2 is drawn off continuously in unladen form from the top space of the separator, liquefied in a condenser at −12° C. and 45 bar and fed back to the reservoir vessel of the high-pressure pump.

If the CO2-soluble substances have been extracted completely (the amount of CO2 needed for this purpose is determined empirically), the extraction is complete. The empirical determination is effected by conducting the extraction in several steps and determining the amount of mono- and oligomers obtained. The determination has ended when virtually no mono- or oligomers are obtained any longer in the separator.

The autoclave containing the cleaned polyoctenamer is then decompressed. The polyoctenamer can be removed from the autoclave for oligomer determination.

Addition of Cosolvent

First of all, 750 g or 1500 g of acetone (5% by weight or 10% by weight) or 750 g of hexane (5% by weight) are mixed into the CO2 until S/F=15. Subsequently, the vessel volume of the autoclave is exchanged twice with CO2. Thereafter, CO2 is added without cosolvent with S/F=35. The cosolvent is removed by initially charging 1000 g of water in the separator, in order to wash the cosolvent out of the gas phase.

Stage b2—Process II

In a departure from process I, no separator is used. However, a vessel arranged downstream of the autoclave containing 300 g of activated carbon as adsorbent. The process is conducted in an isobaric and isothermal manner. The S/F values are correspondingly higher.

Results of the Extraction after Performance of Stage b2

| # | Starting weight/g | Stage b1 | Process | S/F | Extraction pressure/bar | Extraction temperature/° C. | Cosolvent | Adsorbent | Comments |
|---|---|---|---|---|---|---|---|---|---|
| 1* | 1500 | no | I | 60 | 260 | 35 | no | no | polymer 1; granules sintered |
| 2* | 2000 | no | I | 50 | 260 | 35 | no | no | granules sintered |
| 3 | 1000 | yes | I | 50 | 420 | 40 | no | no | no sintering |
| 4 | 1000 | yes | I | 50 | 260 | 40 | 5% acetone | no | no sintering |
| 5 | 1000 | yes | I | 50 | 260 | 40 | 10% acetone | no | no sintering |
| 6 | 1000 | yes | I | 50 | 260 | 40 | no | no | no sintering |
| 7 | 2200 | yes | I | 50 | 260 | 43 | no | no | no sintering |
| 8 | 1000 | yes | I | 50 | 260 | 40 | 5% hexane | no | no sintering |
| 9 | 800 | yes | II | 400 | 260 | 40 | no | activated carbon | no sintering |

-continued

| # | Starting weight/g | Stage b1 | Process | S/F | Extraction pressure/ bar | Extraction temperature/ °C | Cosolvent | Adsorbent | Comments |
|---|---|---|---|---|---|---|---|---|---|
| 10 | 1000 | yes | II | 200 | 250-270 | 40 | no | activated carbon | no sintering |

*noninventive

Unless stated otherwise, polymer 2 was used.

The experiments without the first extraction stage b1 lead to sintering of the polyoctenamer granules used, both in the case of size 3 mm×3 mm×4 mm (polymer 1) and in the case of size 1 mm×1 mm×1 mm (polymer 2) (examples 1 and 2). If, in contrast, liquid $CO_2$ is used at first, no sintering of the granules is observed.

Evaluation

The mono- and oligomers were determined in a double determination according to the instructions in the description.

| # | Monomer/mg/kg | Dimer/mg/kg | Trimer/mg/kg | Tetramer/ mg/kg |
|---|---|---|---|---|
| Polymer 2 | 18 | 1629 | 9969 | 6604 |
| 3 | 1 | <100 | 156 | 1797 |
| 4 | n.d. | <100 | 223 | 1389 |
| 5 | n.d. | 199 | 1010 | 2883 |
| 6 | 2 | <100 | 525 | 2472 |
| 7 | n.d. | <100 | 810 | 2199 |
| 8 | n.d. | <100 | <150 | 1913 |
| 9 | 3 | <100 | <150 | 1276 |
| 10 | 3 | <100 | <150 | 1763 | n.d. = not determined

By the extraction method, it was possible to significantly reduce oligomers compared to the product mixture that had not been worked up. If the extraction pressure is increased (420 bar in Example 3 compared to 260 bar in Example 6), the oligomer content can be lowered further. The use of a cosolvent (Examples 4, 5 with acetone and 8 with hexane) has an entirely positive effect on the result, but the proportion of the cosolvent must not become too high: Example 4 with 5% acetone shows better extraction results than Example 5 with 10% acetone. An increase in the extraction temperature from 35° C. or 40° C. to 43° C. does not show any significant effect.

Process II (Examples 9, 10), just like process I (Examples 3 to 8), is suitable for the oligomer removal. Compared to process I, lower oligomer contents are determined.

The invention claimed is:

1. A process of preparing a packaging material, the process comprising producing a polyalkenamer-containing composition by a process comprising:
    a) converting at least one cycloalkene by ring-opening metathetic polymerization to obtain a polyalkenamer-containing product mixture, and
    b) working up the polyalkenamer-containing product mixture by an extraction with $CO_2$, thereby removing at least one monomer and/or at least one oligomer of the at least one cycloalkene to obtain the polyalkenamer-containing composition,
    wherein the extraction comprises at least two stages:
    b1) an extraction with liquid $CO_2$ and then
    b2) an extraction with supercritical $CO_2$
    wherein the polyalkenamer-containing composition is suitable for a packaging material.

2. The process according to claim 1, wherein the extraction in stage b1 is conducted at a temperature in the range from 0° C. to 99° C. and a pressure in the range from 10 bar to 1000 bar, and wherein the extraction in stage b1 comprises keeping $CO_2$ in liquid form by adjusting pressure and temperature with respect to one another.

3. The process according to claim 2, wherein the pressure is above and the temperature is below a critical value for $CO_2$.

4. The process according to claim 1, wherein the extraction in stage b2 is conducted at a temperature in the range from 31° C. to 99° C. and a pressure in the range from 74 bar to 1000 bar.

5. The process according to claim 1, wherein a relative mass throughput is between 10 kg and 500 kg of $CO_2$ per polyalkenamer-containing product mixture.

6. The process according to claim 1, further comprising separating $CO_2$ extractant from the at least one monomer and/or at least one oligomer.

7. The process according to claim 6, wherein the $CO_2$ extractant is gaseous.

8. The process according to claim 6, wherein the $CO_2$ extractant is supercritical and an adsorbent takes up the at least one monomer and/or at least one oligomer.

9. The process according to claim 8, wherein a pressure is maintained with respect to step b2 and a temperature is reduced, providing isobaric conditions.

10. The process according to claim 8, wherein the adsorbent is selected from the group consisting of activated carbon, alumina, silica and mixtures thereof.

11. The process according to claim 1, wherein the cycloalkene is selected from the group consisting of cyclobutene, cyclopentene, cycloheptene, cyclooctene, cyclononene, cyclodecene, cyclododecene, cycloocta-1,5-diene, 1,5-dimethylcycloocta-1,5-diene, cyclodecadiene, norbornadiene, cyclododeca-1,5,9-triene, trimethylcyclododeca-1,5,9-triene, norbornene (bicyclo[2.2.1]hept-2-ene), 5-(3'-cyclohexenyl)-2-norbornene, 5-ethyl-2-norbornene, 5-vinyl-2-norbornene, 5-ethylidene-2-norbornene, dicyclopentadiene and mixtures thereof.

12. The process according to claim 1, wherein converting at least one cycloalkenes is conducted in the presence of a catalyst.

13. The process according to claim 12, wherein the catalyst comprises at least one transition metal halide and an organometallic compound or wherein the catalyst comprises at least one transition metal-carbene complex.

14. The process according to claim 1 wherein the packaging material is suitable as a food packaging and/or a drink packaging.

15. The process according to claim 1, wherein no supercritical $CO_2$ is present in b1) the extraction with liquid $CO_2$, and wherein a polyalkenamer in the polyalkenamer-containing composition is not sintered or compressed in b) working up the product mixture.

16. The process according to claim 1, wherein the polyalkenamer-containing composition has a total content of monomer, dimer, trimer, and tetramer impurities of less than 20,000 ppm.

17. The process according to claim 1, wherein a polyalkenamer component of the polyalkenamer-containing composition has a weight-average molecular weight (Mw) of 5000 g/mol to 500 000 g/mol.

18. A process for producing a polyalkenamer-containing composition, the process comprising:
   a) converting at least one cycloalkene by ring-opening metathetic polymerization to obtain a polyalkenamer-containing product mixture, and
   b) working up the polyalkenamer-containing product mixture by an extraction with $CO_2$, thereby removing at least one monomer and/or at least one oligomer of the at least one cycloalkene to obtain the polyalkenamer-containing composition,
   wherein the extraction comprises at least two stages:
   b1) an extraction with liquid $CO_2$ and then
   b2) an extraction with supercritical $CO_2$, wherein the polyalkenamer-containing product mixture obtained in a) is in solid form and is granulated or pulverized to particles prior to b) working up the product mixture.

* * * * *